United States Patent [19]

Hiramatsu et al.

[11] Patent Number: 5,287,708
[45] Date of Patent: Feb. 22, 1994

[54] CAR AIR CONDITIONER WITH A HYDRAULICALLY DRIVEN REFRIGERANT COMPRESSOR

[75] Inventors: Osamu Hiramatsu; Kunifumi Goto; Tatsuyuki Hoshino, all of Kariya, Japan

[73] Assignee: Kabushiki Kaisha Toyoda Jidoshokki Seisakusho, Kariya, Japan

[21] Appl. No.: 13,161

[22] Filed: Feb. 1, 1993

Related U.S. Application Data

[63] Continuation of Ser. No. 765,567, Sep. 25, 1991, abandoned.

Foreign Application Priority Data

Sep. 28, 1990 [JP] Japan ............................ 2-102668[U]

[51] Int. Cl.⁵ .................................................. F25B 27/00
[52] U.S. Cl. ..................................... 62/323.1; 417/390
[58] Field of Search ............... 62/323.1; 417/375, 390

[56] References Cited

U.S. PATENT DOCUMENTS

| | | | |
|---|---|---|---|
| 2,467,398 | 4/1949 | Miller | 417/390 X |
| 2,865,558 | 12/1958 | Schemmel | 417/390 X |
| 2,868,438 | 1/1959 | Gammon et al. | 417/390 |
| 2,933,129 | 4/1960 | Wright | 417/390 X |
| 3,937,596 | 2/1976 | Braidwood | 417/390 X |
| 3,957,403 | 5/1976 | Sloan | 417/390 |
| 4,955,585 | 9/1990 | Dickerson | 417/375 X |

*Primary Examiner*—William E. Tapoicai
*Attorney, Agent, or Firm*—Brooks Haidt Haffner & Delahunty

[57] ABSTRACT

A car air conditioner having an air-conditioning circuit for cooling an atmospheric air in a car compartment by a refrigerant gas compressed by a refrigerant compressor driven by an oil hydraulic motor. An axial shaft is extended commonly through both the compressor and oil hydraulic motor to connect the refrigerant compressor in tandem to the oil hydraulic motor, to thereby transmit a drive force of the oil hydraulic motor to the refrigerant compressor. The oil hydraulic motor is operated by an oil under pressure delivered through a flexible oil hose from an oil hydraulic pump driven by a car engine.

2 Claims, 2 Drawing Sheets

CAR AIR CONDITIONER WITH A HYDRAULICALLY DRIVEN REFRIGERANT COMPRESSOR

This application is a continuation of application Ser. No. 07/765,567, filed Sep. 25, 1991, abandoned.

BACKGROUND OF THE INVENTION

1. Field of the Invention

The present invention generally relates to a refrigerant compressor for a car air conditioner, and more particularly, it relates to a car air conditioner provided with a hydraulically driven refrigerant compressor.

2. Description of the Related Art

Car air conditioners use a refrigerant compressor for compressing a refrigerant gas to be delivered to a refrigerating circuit including a condenser, an expansion valve, and an evaporator. A conventional refrigerant compressor for a car air conditioner, such as a vane type compressor, a rotary swash plate type compressor, a wobble plate type compressor and a scroll type compressor, is arranged to be driven by a rotary drive force directly transmitted from a car engine via a solenoid clutch. Namely, when the solenoid clutch is electromagnetically engaged, the rotary drive force of the car engine is directly transmitted to the refrigerant compressor to rotate a drive shaft thereof, to thereby operate a compressing mechanism of the compressor. For example, in the conventional rotary swash plate type compressor, a drive shaft rotates a swash plate when driven, and therefore, the rotated swash plate causes a reciprocatory motion of a plurality of pistons in the compression chambers, and therefore, a refrigerant gas is pumped into the compression chambers to be compressed therein and discharged therefrom after compression.

In the conventional car air conditioner using the conventional refrigerant compressor directly driven by a car engine, however, a transmission mechanism including pulleys, belts and the above-mentioned solenoid clutch is arranged between the car engine and the drive shaft of the compressor to effect the transmission of a drive force of the car engine to the drive shaft of the compressor. Accordingly, the compressor must be located at only a predetermined position in an engine compartment, at which it can be most suitably connected to the car engine via the transmission mechanism, and this often makes it difficult to selectively install the refrigerant compressor at a position within the engine compartment suitable for isolating a car compartment from an irritating noise produced by the compressor during the operation thereof. Consequently, a person or persons in the car compartment may suffer from this noise, which will detract from their enjoyment of and the comfort given by the car air conditioner.

SUMMARY OF THE INVENTION

Therefore, an object of the present invention is to provide a refrigerant compressor for a car air conditioner, capable of obviating defects encountered by the conventional refrigerant compressor of the type directly driven by a car engine.

Another object of the present invention is to provide a novel car air conditioner using a hydraulically driven refrigerant compressor, to thereby permit the compressor to be freely located at any selected position within a car engine compartment.

In accordance with one aspect of the present invention, there is provided a car air conditioner for air-conditioning a passenger and/or driver compartment of a car driven by an engine installed in an engine compartment of the car comprising:

an oil hydraulic pump means arranged at predetermined position in said engine compartment and connected to said engine by a rotation transmission means so as to be driven by said engine, said oil hydraulic pump means delivering an oil under pressure upon being driven;

an oil hydraulic motor means arranged in said engine compartment and connected to said oil hydraulic pump means by a flexible oil distributing hose means extending between said oil hydraulic pump means and said oil hydraulic motor means, said oil hydraulic motor means being driven by said oil under pressure delivered from said oil hydraulic pump means, and including a first rotatable shaft portion means for exerting thereon a rotational drive force when driven;

a refrigerant compressor means arranged in said engine compartment for compressing a refrigerant gas, said refrigerant compressor including a second rotatable shaft portion means operative as a drive shaft thereof, and a compression mechanism driven by said second shaft portion means to thereby compress said refrigerant gas and deliver said compressed refrigerant gas;

an intermediate rotatable shaft portion means for coaxially connecting said first rotatable shaft portion means of said oil hydraulic motor means to said second rotatable shaft portion means of said refrigerant compressor means to thereby directly transmit said rotational drive force of said first rotatable shaft portion means to said second rotatable shaft portion means; and, an air-conditioning circuit arrangement for conducting an air-conditioning of an atmospheric air in said passenger and/or driver compartment of said car by using said compressed refrigerant gas delivered by said refrigerant compressor.

In accordance with another aspect of the present invention, there is provided a refrigerant compressor driven by an oil hydraulic motor for compressing a refrigerant gas circulated in an air-conditioning circuit of a car comprising:

a housing means provided with an inlet port for the refrigerant gas to be compressed and a delivery port for the refrigerant gas after compression;

a cylinder block element arranged in said housing means for defining therein at least one cylinder chamber;

a compressing means arranged in said cylinder chamber for compressing the refrigerant gas to be compressed, and discharging the compressed refrigerant gas;

a rotatably arranged shaft means including a portion thereof rotatably arranged in said housing means, said portion of said shaft means mounting thereon a means for causing an operation of said compressing means in response to a rotation of said shaft means, said shaft means commonly extending through both said oil hydraulic motor and said refrigerant compressor, to thereby connect said refrigerant compressor in tandem to said oil hydraulic motor.

BRIEF DESCRIPTION OF THE DRAWINGS

The above and other objects, features and advantages of the present invention will be made more apparent from the ensuing description of a preferred embodiment of the present invention with reference to the accompanying drawings wherein.

DESCRIPTION OF THE PREFERRED EMBODIMENTS

Figure 1:
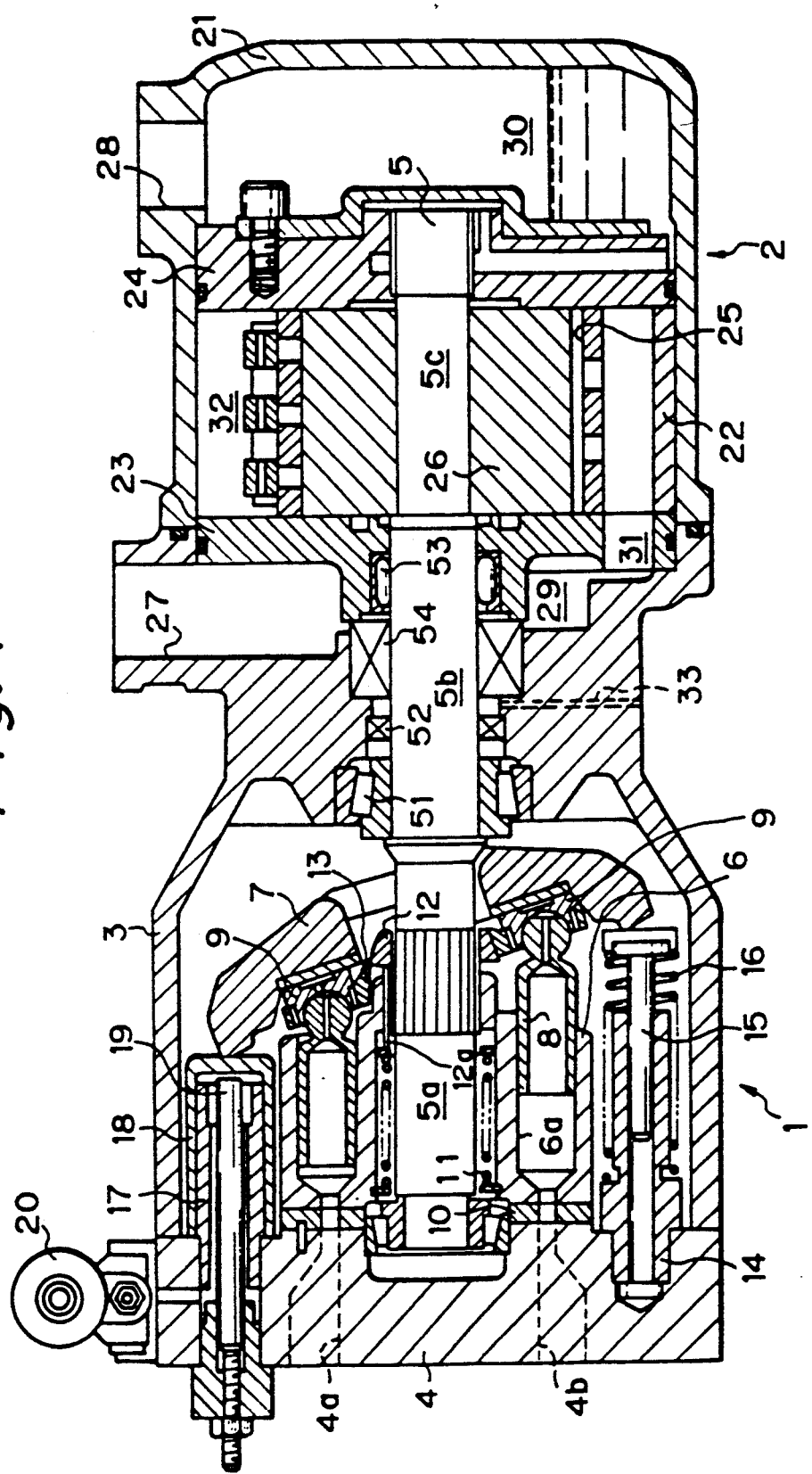
FIG. 1 is a longitudinal cross-sectional view of a refrigerant compressor connected in tandem to a hydraulic drive source, i.e., an oil hydraulic motor driven by an oil hydraulic pump and driving the compressor according to an embodiment of the present invention.

Referring to FIG. 1, a refrigerant compressor 2 for a car air conditioner is centrally provided with a rotatable drive shaft 5, and is connected in tandem to an oil hydraulic motor 1. Namely, the drive shaft 5 is extended from the refrigerant compressor 2 into the oil hydraulic motor 1 to thereby form a common drive shaft for interconnecting the motor 1 and the compressor 2. The common drive shaft 5 is provided with three axial portions, i.e., a left-hand portion 5a, a middle portion 5b, and a right-hand portion 5c.

The oil hydraulic motor 1 is a variable capacity axial piston type oil hydraulic motor provided with an intermediate housing 3 and an end covering 4 which defines a closed chamber in which the portion 5a of the common drive shaft 5 is extended so that an extremity of the portion 5a is supported by anti-friction bearing housed in the end covering 4. Namely, the portion 5a forms a motor shaft of the oil hydraulic motor 1.

The middle portion 5b of the common drive shaft 5 is supported by an anti-friction bearing 51, and extended through the intermediate housing 3. Seal 52 and 54 are attached to the middle portion 5b of the drive shaft 5 to establish a hydraulic isolation between the oil hydraulic motor 1 and the refrigerant compressor 2. The portion 5c of the common drive shaft 5 is extended in a chamber of the compressor 2 defined by a rear housing 21.

The left-hand portion 5a of the drive shaft 5 is provided with spline formed thereon, and a cylinder block 6 is engaged with the spline of the portion 5a to be axially slidable on the portion 5a. The cylinder block 6 is provided with a plurality of axial cylinder bores 6a in which a plurality of pistons 8 are slidably reciprocally arranged, and the pistons 8 are connected to a swash plate 7 via shoes 9. The swash plate 7 in the form of a generally annular member is swingably pivoted to the intermediate housing 3, and disposed around the portion 5a of the common drive shaft 5. A valve plate 10 is arranged between the end covering 4 and the cylinder block 6, and fixed to the end covering 4. The valve plate 10 is provided with a plurality of through-holes which can be communicated with the cylinder bores 6a. The through-holes of the valve plate 10 are connected to either an inlet port 4a or an outlet port 4b of the end covering 4.

A compression spring 11 in the form of a coil spring is disposed in an annular bore formed between an inner cylindrical face of the cylinder block 6 and the circumference of the left-hand portion 5a of the common drive shaft 5. The compression spring 11 is arranged around an appropriate spacer member (not shown in FIG. 1) arranged around the portion 5a of the drive shaft 5, and one end of the spring 11 is seated against a circular clip fixed to the cylinder block 6 to thereby constantly urge the cylinder block 6 toward the valve plate 10. The other end of the compression spring 11 is in contact with a circular ring member slidably arranged in the annular bore, and urges a pivot member 12 via a pin member 12a toward a right-hand end of the portion 5a of the common drive shaft 5. The pivot 12 is loosely engaged with a shoe retainer element 13 which is engaged with the shoes 9.

A guiding cylinder 14 is fixed at one end thereof to the end covering 4 to be projected into the closed chamber of the oil hydraulic motor 1, and has an axial bore for receiving therein a slidable pressing rod 15 having an end engaged with the swash plate 7. The pressing rod 15 is constantly urged toward the swash plate 7 by a coil spring 16 which is seated at one end thereof against an circular step formed in the circumference of the guiding cylinder 14. A supporting cylinder 17 is arranged at a position diametrically symmetrical with the guiding cylinder 14 with respect to the axis of the common drive shaft 5, and fixed to the end covering 4. The supporting cylinder 17 supports a cylindrical mover 18 slidably fitted thereon. The cylindrical mover 18 has one closed end capable of being engaged with the swash plate 7, and can be axially moved toward and away from the swash plate 7. An adjusting rod 19 inserted in a central bore of the supporting cylinder 17 is provided for adjusting an extent of the axial movement of the cylindrical mover 18. As shown in FIG. 1, the cylindrical mover 18 is moved to a retracted position thereof, and the adjusting rod 19 is positioned at a non-engaged position before adjustment. The position of the adjusting rod 19 can be adjustably changed by a threaded screw formed at an outer end thereof, and an associated nut member.

A control valve 20 is fixed to the outer face of the end covering 4 for controlling a supply of a pressurized oil supplied between the supporting cylinder 17 and the cylindrical mover 18. When the pressurized oil is supplied, the cylindrical mover 18 is moved on the supporting cylinder 17 to a position where the pressure of the pressurized oil is balanced with the spring force of the coil spring 16, and controls an angle of inclination of the swash plate 7, and thus a number of rotations of the oil hydraulic motor 1.

The refrigerant compressor 2 is a vane type compressor provided with a cylinder block 22 fixedly housed in a closed chamber defined by the intermediate housing 3 and the rear housing 21. The cylinder block 22 is provided with a cavity formed therein to have an elliptical cross section in a plane perpendicular to the axis of the common drive shaft 5. The axially opposite ends of the cylinder block 22 are closed by front and rear end plates 23 and 24, respectively, so as to define an elliptical cylinder chamber 25 in the cylinder block 22. The front and rear end plates 23 and 24 are provided with a round shaft bore, respectively, to rotatably support the right-hand portion 5c of the common drive shaft 5. An anti-friction bearing 53 for supporting a left-hand end of the portion 5c is housed by the front end plate 23. The portion 5c of the common drive shaft 5 supports thereon a rotor element 26 fixed thereto and arranged in the elliptical cylinder chamber 25. The rotor 26 having a circular cross section is provided with a plurality of (typically, four) radial grooves (not shown) for radially slidably receiving vanes (not-shown four vanes), and arranged to be symmetrical with another with respect to the axis of rotation of the common drive shaft 5. Thus, four compression chambers are formed in the elliptical cylinder chamber 25 in such a manner that each compression chamber is enclosed by two adjacent vanes, the outer circumference of the rotor 26, inner face of the cylinder chamber 25 of the cylinder block 22, and the front and rear end plates 23 and 24.

A suction port 27 for a refrigerant gas is formed in the intermediate housing 3 and the front end plate, and a delivery port 28 is formed in the rear housing 21. The suction port 27 is communicated with a suction chamber 29 formed between the intermediate housing 3 and the front end plate 23. The delivery port 28 is communicated with a oil-gas separating chamber 30 formed between the rear end plate 24 and the rear housing 21.

When the common drive shaft 5 reaches a first predetermined angular position during the rotation thereof, the suction chamber 29 is communicated with the above-mentioned compression chambers via a suction passageway 31 formed in the front end plate 23 and the cylinder block 22, so that the refrigerant gas to be compressed is introduced into the compression chambers. When the common drive shaft 5 reaches a second predetermined angular position, the compression chambers are communicated with a discharge chamber 32 communicated with the oil-gas separating chamber 30 via a gas passageway (not shown in FIG. 1), so that the compressed refrigerant gas is discharged toward the discharge chamber 32.

An oil drain passageway 33 is formed in the intermediate housing 3 at a position located between the two seals 52 and 54. The oil drain passageway 33 is provided for returning oil, which leaks from the closed chamber of the oil hydraulic motor 1 into the space between the two seals 52 and 54, toward an oil reservoir 731 of an oil hydraulic pump 73 shown in FIG. 2. The oil drain passageway 33 also returns lubricating oil suspended in the refrigerant gas in the suction chamber 29 of the compressor 2 toward the above-mentioned oil reservoir 731, when the lubricating oil leaks from the suction chamber 29, toward the space between the two seals 52 and 54.

Figure 2:
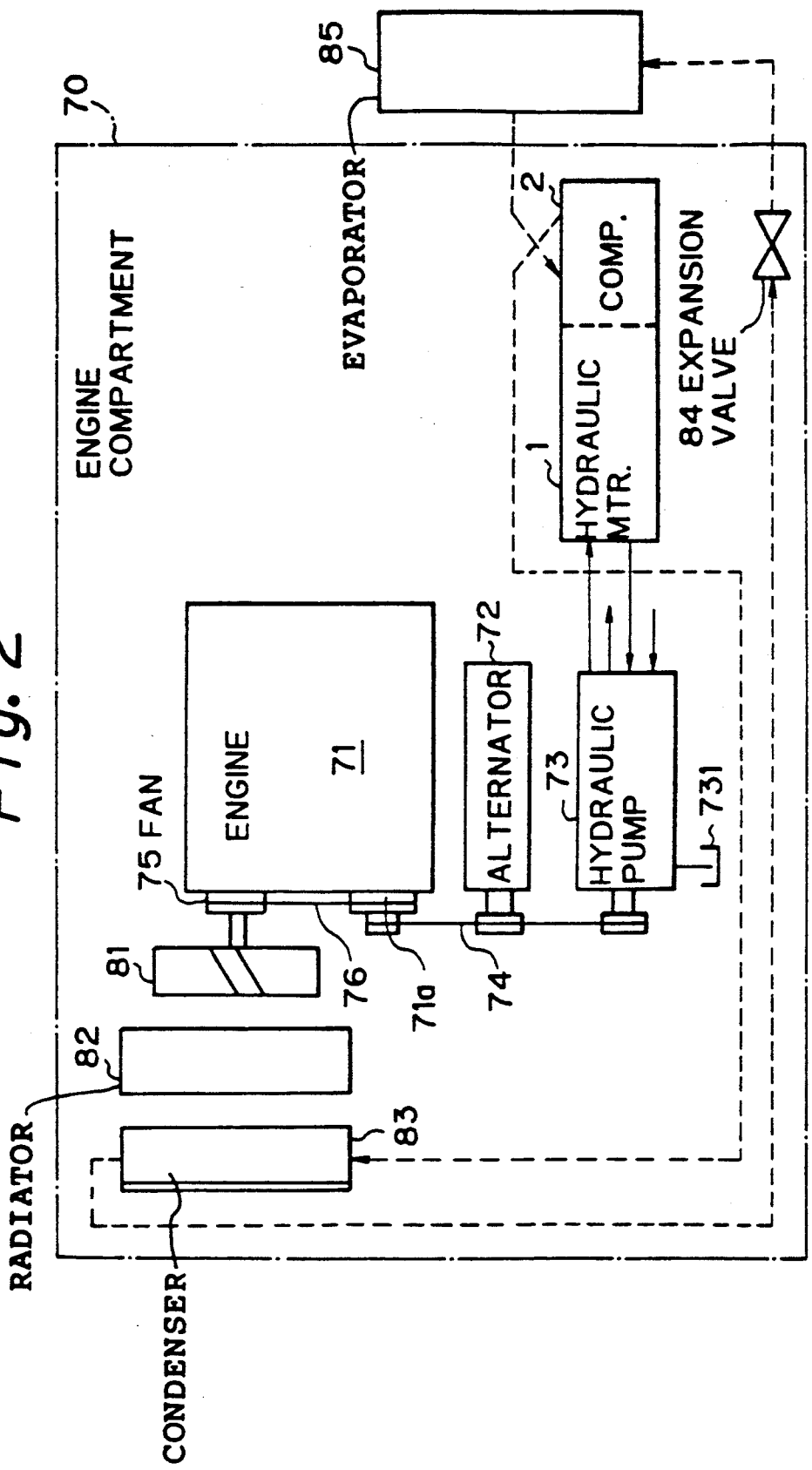
FIG. 2 is a diagrammatic view of a car air conditioner which uses the hydraulically driven refrigerant compressor according to the embodiment of the present invention.

The above-described oil hydraulic motor 1 and refrigerant compressor 2 are installed in an engine compartment 70 of a car as schematically illustrated in FIG. 2, and operate as important constituents of a car air conditioner.

Referring to FIG. 2, a car engine 71 mounted in the engine compartment 70 is provided with a crankshaft 71a thereof operatively connected to an alternator 72 and the oil hydraulic pump 73 by a common belt 74, and the crankshaft 71a is also connected to a water pump 75 by another belt 76.

The oil hydraulic pump 73 is provided with an oil discharge hose to be extended toward an oil pan of the car engine 71, a hydraulic power steering circuit, and the inlet port 4a of the oil hydraulic motor 1 of FIG. 1. The oil hydraulic pump 73 is also provided with an oil suction hose to be extended toward the oil pan of the car engine 71, and the outlet port 4b of the oil hydraulic motor 1. The above-mentioned oil reservoir 731 of the oil hydraulic pump 73 is provided for obtaining clean oil by removing a contaminant from the oil, and the clean oil is returned to the oil hydraulic pump 73 via a charging pump (not illustrated in FIG. 2).

The crankshaft 71a of the engine 71 rotates a fan 81 arranged to face a radiator 82, which in turn faces a condenser 83 of an air conditioning circuit. The condenser 83 has an inlet (not shown) connected to the delivery port 28 (FIG. 1) of the refrigerant compressor 2 by a hose means for the compressed refrigerant gas, and an outlet (not shown) connected to the suction port 27 of the compressor 2 via an expansion valve 84, and an evaporator 85 by another hose means for the refrigerant gas before compression.

The description of the operation of the above-mentioned car air conditioner will be provided hereinbelow with reference to FIGS. 1 and 2.

When the car engine 71 is driven, the fan 81 is rotated by the crankshaft via the belt 76, and the oil hydraulic pump 73 is also operated via the belt 74. A part of the pressurized oil delivered from the oil hydraulic pump 73 is supplied to the oil hydraulic motor 1. Therefore, the supplied pressurized oil is introduced into the motor 1 via the inlet port 4a, and causes a reciprocatory motion of the pistons 8 in the associated cylinder bores 6a, and accordingly, the cylinder block 6 is rotated together with the left-hand portion 5a of the common drive shaft 5. At this stage, in the oil hydraulic motor 1, operating oil introduced into the control valve 20 is used for changing the number of rotations of the drive shaft portion 5a.

The pressurized oil, which has rotated the drive shaft portion 5a, is delivered from the outlet port 4b of the motor 1 and returned to the oil hydraulic pump 73.

The rotation of the left-hand portion 5a of the common drive shaft 5 is transmitted, via the middle portion 5b, to the portion 5c of the same drive shaft 5 in the refrigerant compressor 2. Therefore, when the drive shaft portion 5c is rotated, the rotor 26 and the vanes accommodated in the rotor 26 are also rotated to thereby pump the refrigerant gas from the suction chamber 29, compress the refrigerant gas in the respective compression chambers, and discharge the compressed gas toward the discharge chamber. The compressed gas at a high temperature is discharged from the discharge chamber toward the outside the compressor 2 through the delivery port 28. The compressed gas delivered from the delivery port 28 flows to the condenser 83, in which it is condensed to become a liquid, and the liquidized refrigerant then flows to the expansion valve 84 in which it is expanded to become a low temperature and pressure mist, and further flows to the evaporator 85, and the refrigerant mist is used for conducting a heat exchange with an atmospheric air, to thereby cool the atmospheric air. The cooled air is used for the air-conditioning of the car compartment. The refrigerant mist after the exchange of heat with the atmospheric air becomes a gas, and flows to the refrigerant compressor 2 via the inlet port 27.

In the above-described car air conditioner of FIGS. 1 and 2, the car engine 71 directly drives the oil hydraulic pump 73 to thereby deliver the pressurized oil therefrom for driving the oil hydraulic motor 1. The oil hydraulic motor 1 in turn drives the refrigerant compressor 2, which is connected in tandem by the common drive shaft 5, and therefore, the refrigerant compressor 2 is not directly driven by the car engine 71. Namely, there is no need for the refrigerant compressor 2 to be connected to the car engine 71 by using a belt-pulley mechanism, and the compressor 2 can be hydraulically driven by the pressurized oil delivered from the oil hydraulic pump 73 via the oil hydraulic motor 1. Since the oil hydraulic motor 1 can be operatively connected to the oil hydraulic pump 73 by using flexible oil hoses, the refrigerant compressor 2 connected in tandem to the motor 1 need not necessary be arranged at a predetermined position within the engine compartment 70, in relation to the car engine 71.

In the described car air conditioner, since the drive force of the car engine 71 is converted by the oil hydraulic pump 73 into a pressurized oil for driving the refrigerant compressor 2 via the variable capacity oil hydraulic motor 1, the drive force exerted by the car engine 71 is indirectly used for driving the refrigerant compressor 2. Therefore, the delivery capacity of the refrigerant gas delivered by the refrigerant compressor 2 can be easily controlled by controlling the capacity of the oil hydraulic motor 1. Accordingly, a control of the operation of the car air conditioner can be achieved by controlling the behavior of the oil used as a hydraulic operation medium, which is easily controlled. Therefore, even if the rotation of the car engine is frequently changed in response to a change in a car speed, the car air conditioner can be operated at a high efficiency with a minimum of energy loss. Moreover, as the operation of the refrigerant compressor 2 at a high speed range can be easily controlled by controlling the operation of the oil hydraulic motor 1, a long operation life of the bearings of the common drive shaft 5, such as the anti-friction bearings 51 and 53, can be obtained.

In the refrigerant compressor 2 connected in tandem to the oil hydraulic motor 1, the intermediate housing 3 and the common drive shaft 5 are shared by both the motor 1 and the compressor 2, and therefore, the number of mechanical elements used for assembling these motor and compressor can be less than those needed when an individual oil hydraulic motor and refrigerant compressor are connected to one another, and accordingly, a lowering of the manufacturing cost as well as a reduction in the size and weight of the car air conditioner can be achieved. This results in a greater feasibility of the mounting of the car air conditioner in the considerably narrow engine compartment 70.

Also, in the described car air conditioner, although the middle portion 5c of the common drive shaft 5 is supported by two anti-friction bearings 51 and 53, the oil seal 52, and the shaft seal 54, if a single anti-friction bearing arranged between the oil seal and the shaft seal is used for supporting the portion 5c, it is possible to further reduce the number of mechanical elements used for assembling the oil hydraulic motor and the refrigerant compressor connected in tandem to one another, and an additional reduction in the manufacturing cost of the car air conditioner can be achieved.

In the described embodiment, a variable capacity oil hydraulic motor and a vane type refrigerant compressor are connected in tandem by a common drive shaft. Nevertheless, it should be understood that various type oil hydraulic motors and various type refrigerant compressors can be connected in tandem to one another. Further, if either the oil hydraulic pump or the oil hydraulic motor has a variable capacity, the compressor capacity can be easily controlled by controlling either a capacity of a pressurized oil supplied from the pump to the motor or a capacity of the motor. This means that the operation of the car air conditioner according to the present invention can be controlled more easily than that of the conventional car air conditioner employing a refrigerant compressor directly driven by a car engine via a solenoid clutch.

It should be understood that, in accordance with the present invention, since an arrangement of the refrigerant compressor connected in tandem to the oil hydraulic motor within the engine compartment is not limited to only a predetermined position, the compressor can be installed at a position as far from the car compartment as possible in order to avoid a transmission of a noise of the compressor generated during the compressing operation thereof. Namely, the mounting adaptability of the refrigerant compressor in a car compartment is higher than that of the refrigerant compressor of the conventional car air conditioner.

We claim:

1. A refrigerant compressor, driven by an oil hydraulic motor for compressing a refrigerant gas circulated in an air-conditioning circuit of a car comprising:

a housing means provided with an inlet port for the refrigerant gas to be compressed and a delivery port for the refrigerant gas after compression;

a cylinder block element arranged in said housing means for defining therein at least one cylinder chamber;

a compressing means arranged in said cylinder chamber for compressing the refrigerant gas to be compressed, and discharging the compressed refrigerant gas;

a rotatably arranged shaft means including a portion thereof rotatably arranged in said housing means, said portion of said shaft means mounting thereon a means for causing operation of said compressing means in response to a rotation of said shaft means, said shaft means comprising a single common shaft extending through both said oil hydraulic motor and said refrigerant compressor, to thereby connect said refrigerant compressor in tandem to said oil hydraulic motor;

said oil hydraulic motor comprising an axial piston type variable capacity oil hydraulic motor operated by oil under pressure delivered from an oil hydraulic pump driven by the engine of said car, said axial piston type variable capacity oil hydraulic motor having a motor housing means for rotatably supporting a part of said single common shaft, said motor housing means being sealingly connected to said housing means of said refrigerant compressor;

said motor housing means having disposed therein first and second axially spaced shaft sealing means mounted on said single common shaft and defining therebetween an annular space for receiving said oil when leaking from said oil hydraulic motor through said first shaft sealing means; and an oil drain passageway means formed in said motor housing means in fluid communication with said annular space between said sealing means.

2. A car air conditioner for air-conditioning a passenger and/or driver compartment of a car driven by an engine installed in an engine compartment of the car comprising:

an oil hydraulic pump means arranged at a predetermined position in said engine compartment and connected to said engine by a rotation transmission means so as to be driven by said engine, said oil hydraulic pump means delivering oil under pressure upon being driven;

an oil hydraulic motor means arranged in said engine compartment and connected to said oil hydraulic pump means by a flexible oil distributing hose means extending between said oil hydraulic pump means and said oil hydraulic motor means, said oil hydraulic motor means being driven by said oil under pressure delivered from said oil hydraulic pump means, and including a first housing means and a first rotatable shaft portion means rotatably supported in said first housing means for exerting a rotational drive force when driven;

a refrigerant compressor means arranged in said engine compartment for compressing a refrigerant gas, said refrigerant compressor including a second housing means, a second rotatable shaft portion means operative as a drive shaft thereof, and a compression mechanism housed in said second housing means and driven by said second shaft portion means to thereby compress said refrigerant gas and deliver said compressed refrigerant gas, said second housing means being sealingly connected to said first housing means of said oil hydraulic motor means;

an intermediate rotatable shaft portion means for coaxially connecting said first rotatable shaft portion means of said oil hydraulic motor means to said second rotatable shaft portion means of said refrigerant compressor means to thereby directly transmit said rotational drive force of said first rotatable shaft portion means to said second rotatable shaft portion means, said intermediate shaft portion means and said first and second shaft portion means being three individual portions of a common axially extended drive shaft of said oil hydraulic motor and said refrigerant compressor to thereby connect said refrigerant compressor means in tandem to said oil hydraulic motor means;

an air-conditioning circuit arrangement for air-conditioning the atmospheric air in said passenger and/or driver compartment of said car by using said compressed refrigerant gas delivered by said refrigerant compressor, first and second axially spaced shaft sealing means mounted on said intermediate shaft portion means and arranged in said first housing means to define an annular space therebetween for receiving said oil when leaking from said oil hydraulic motor means through said first oil sealing means; and an oil drain passageway means formed in said first housing means in fluid communication with said annular space between said sealing means.

* * * * *